United States Patent Office 3,769,255
Patented Oct. 30, 1973

3,769,255
TiO₂ PIGMENTS
Gerard Martin Sheehan and George Leathwhite Roberts, Jr., Savannah, Ga., and Paul Montgomery Dupree, Flemington, N.J., assignors to American Cyanamid Company, Stamford, Conn.
No Drawing. Continuation-in-part of application Ser. No. 848,353, Aug. 7, 1969, now Patent No. 3,658,566. This application Apr. 14, 1972, Ser. No. 244,245
Int. Cl. C08f 45/04
U.S. Cl. 260—41 A          3 Claims

ABSTRACT OF THE DISCLOSURE

A vinyl asbestos tile composition with improved properties obtained through adding to the tile preparation a pigmentary $TiO_2$ which is treated with the combined oxides of silicon and aluminum, the oxides being used in a weight ratio of 5-1 and in a concentration such that the pigment will have at least 0.5% by weight of oxides coating.

---

This application is a continuation-in-part of application Ser. No. 848,353, filed Aug. 7, 1969, now U.S. Pat. No. 3,658,566.

This invention relates to improved vinyl asbestos tiles obtained by preparing such tiles with $TiO_2$ pigments of enhanced physical properties. More particularly, the present invention relates to a vinyl asbestos tile prepared with finely divided hydro-classified $TiO_2$ heated with a specially proportioned combination of hydrous oxides of silicon and aluminum.

It is known that $TiO_2$ pigmented resinous materials can be stabilized by the use of pigment coated with hydrous oxides of silicon and aluminum. This is disclosed in U.S. Pat. No. 3,035,966, issued May 22, 1962, as a means of improving the resistance of pigmented resins, especially paper laminates, to discoloration by sunlight. In accordance with the patent, the preferred way of preparing the stabilized pigmented resinous compositions is by admixing a slurry of the $TiO_2$ pigment and the two hydrous oxides in a ratio such that from 1–2 moles of alumina are present for each mole of silica and the combination of hydrous oxides is in a concentration equal to 2–15% of the weight of the $TiO_2$. The use of equimolar amounts of silica and alumina is shown to give the greatest protection of any other silica-alumina combination although the effectiveness of a given mixture of hydrous oxides seemed from the data to depend upon the concentration of hydrous oxides in the coating composition. At any rate, relatively high percentages of hydrous oxides were used to attain the sought-after light stability.

It is an object of the present invention to provide a method for preparing improved vinyl asbestos tile with hydrous oxide treated $TiO_2$ for these specialty applications where brightness and ease of dispersibility are important consideration in addition to the concentrationally recognized need for good light stability.

In accordance with this invention, these and other objects are achieved by preparing vinyl asbestos tile with $TiO_2$ particles treated with a mixture of hydrous oxides of silicon and aluminum in a proportion such that at least about four parts of silica are used for each part of alumina and in an amount such that the treatment with the combined oxides employs at least 0.5 weight percent based on the weight of the untreated $TiO_2$. The ratio of silica to alumina, preferably, should be in the range of about 5–6 parts of silica based on the weight of alumina. It is critical, however, that at least about 0.5% of silica be employed in treating the $TiO_2$. When less than this percent is used, it is found that brightness of the final vinyl asbestos tile is reduced considerably. This, in accordance with the present invention, the improved $TiO_2$ pigment must contain a minimum concentration of silica and a definite amount of alumina, the amount being proportioned on the concentration of silica. Surprisingly, vinyl asbestos tiles with enhanced brightness and color tone are obtainable only when prepared with $TiO_2$ treated with the proportions and concentrations of the hydrous oxides discovered in accordance with the present invention. When, for example, a given amount of silica is present in the $TiO_2$ compositions, the degree of vinyl asbestos tile brightness may vary considerably depending upon the proportionate concentration of alumina. It is similarly surprising that the use of silica and alumina in a ratio of 5 or greater does not result in tile compositions of desired brightness and color tone when the minimum concentration of silica required by this invention is not present in the final $TiO_2$ pigment.

This invention may be used with improved pigmentary $TiO_2$, either anatase or rutile structure, derived by conventional methods involving calcination of titania hydrolysates (i.e., pigmentary $TiO_2$ from the "sulfate" process); or combustion of titanium tetrachloride (i.e., $TiO_2$ from the "chloride" process); or high temperature hydrolysis of titanium tetrachloride. From the above methods, an aqueous slurry of $TiO_2$ pigment is obtained at any desired solids content (e.g., 15% to 30% by weight). In usual practice, the slurry is treated with a small amount of sodium hydroxide (0.05% by weight of $TiO_2$) or other dispersing agent for the purpose of deflocculation and is then hydroclassified by any convenient technique to eliminate particles coarser than about four microns. The hydro-classified particles thus obtained are subjected to treatment with hydrous oxides of silicon and aluminum whereby the $TiO_2$ pigment is improved in the aforementioned respects. Generally, treatment with the combined hydrous oxides may be followed immediately by dewatering; or first by aging at any temperature in the range of 5–100° C. for periods up to about 24 hours and then dewatering. The dewatered oxide-treated $TiO_2$ is then washed substantially free of soluble salts and dried. The resulting cake can be broken up by conventional milling means. One especially suitable procedure for accomplishing this end is fluid energy milling as carried out in a Reductionizer or Micronizer with either air or super-heated steam at a temperature of above about 450° F. and under a pressure of about 100–175 p.s.i.g.

The hydrous alumina and silica can be incorporated with the $TiO_2$ by the formation of the hydrous oxides in situ. The procedure may be accomplished for example by the addition of an aluminum salt such as aluminum sulfate and a soluble silicate, followed by adjustment of pH whereby the hydrous alumina and silica are formed. When both the aluminiferous and siliceous materials have been added to the slurry of titanium dioxide pigment, the mixture may be conditioned by heating to any temperature in the range of room temperature to the boiling point of the mixture. Heating may be conducted for several hours although a period of 1–3 hours is adequate. After heating, the treated $TiO_2$ is filtered, washed substantially free of soluble salts and then dried. The dried pigment may be milled to the desired degree of sub-division by conventional means as aforementioned. Optionally, prior to milling, the $TiO_2$ pigment may be treated as disclosed in U.S. Pat. No. 3,015,573 for the purpose of improving dispersibility with materials such as triethanolamine and ethylhexoic acid.

Suitable sources of hydrous alumina are its water soluble salts which are readily hydrolyzable, such as aluminum sulfate, aluminum chloride and sodium aluminate. Representative sources of hydrous silica are soluble silicates, such as potassium, sodium, and ammonium, and silicic acid sols.

This improved $TiO_2$ pigment is highly suitable for preparation of vinyl asbestos tile. To test the vinyl asbestos tiles obtained by the present invention, use has been made in the following examples of a Hunter Multi-Purpose Reflectometer which determines the brightness and yellowness of samples to be tested. Yellowness is reported in the following examples as yellow factor which is determined by the following equation:

$$\text{Yellow factor} = \frac{A-B}{G} \times 100$$

wherein

A=Amber reflectance
B=Blue reflectance
G=Green reflectance

Brightness was determined as the percent of green light reflected from the test sample when exposed to light from a green filter. A high yellow factor is indicative of undesirable color tone.

In several of the examples, a Hunter D-25 Color Difference Meter was used to determine the brightness as $R_D$ which is a measure of green reflectance, and the yellowness as $B_L$ of the test samples.

The following examples, in which parts and percentages are by weight unless otherwise specified, are presented to further illustrate the present invention.

The concentration of the hydrous oxides is based upon the weight of the $TiO_2$ to be treated and is expressed in terms of percent silica and alumina.

EXAMPLE 1

$TiO_2$ pigments prepared as follows were incorporated with a vinyl asbestos composition and made with tiles which were tested for brightness and yellowness. Results are reported in Table I.

Pigment (1A)

To a hydro-classified slurry of rutile $TiO_2$ (700 parts) of about 20% solids, was added 0.2% $SiO_2$ as "N" brand (Philadelphia Quartz Company) sodium silicate with $SiO_2/Na_2O$ ratio of 3.22. The slurry was then heated to 70° C. and treated with aluminum sulfate solution, yielding a pH of 6.0 and an $Al_2O_3$ content of 0.03%. The slurry was then mixed for 2 hours at 70° C., filtered, washed substantially free of soluble salts and dried. After drying the pigment was fluid-energy milled for two passes in a 2" Reductionizer with steam at 500° F. and 120 p.s.i.g.

Pigment (1B)

Same as Pigment (1A) except 0.5% $SiO_2$ as "N" brand sodium silicate and 0.07% $Al_2O_3$ as aluminum sulfate were added to the $TiO_2$ slurry.

Pigment (1C)

Same as Pigment (1A) except 1.0% $SiO_2$ and 0.14% $Al_2O_3$ were added to the $TiO_2$ slurry.

TABLE I

| Pigment | Percent $SiO_2$ | Percent $Al_2O_3$ | Ratio $SiO_2/Al_2O_3$ | Percent green brightness | Yellow factor |
|---|---|---|---|---|---|
| (1A) | 0.2 | 0.03 | 7 | 45.0 | 7.01 |
| (1B) | 0.5 | 0.07 | 7 | 45.3 | 6.68 |
| (1C) | 1.0 | 0.14 | 7 | 45.0 | 6.14 |

Vinyl asbestos tile made with $TiO_2$ containing $SiO_2$ and $Al_2O_3$ in listed amounts / Hunter reflectometer From the foregoing, it can be noted that Pigment (1A) prepared with $TiO_2$ containing the below-minimum concentration of $SiO_2$ was considerably yellower than the other two samples, although its brightness was satisfactory. Pigments (1B) and (1C) prepared with $TiO_2$ containing the same $SiO_2/Al_2O_3$ ratios were, nevertheless, bluer, i.e., less yellow. This example thus illustrates that tiles prepared with $TiO_2$ of increasing silica content were less yellow but of essentially the same brightness.

Vinyl asbestos tile preparation: The vinyl asbestos tiles of the examples were prepared by the following procedure using a vinyl asbestos tile compound plus a titanium dioxide pigment concentration of 2% as follows:

| | Parts |
|---|---|
| Vinyl asbestos compound | 196.0 |
| Titanium dioxide pigment | 4.0 |
| | 200.0 |

The composition of the vinyl asbestos compound was as follows:

| | Parts/weight |
|---|---|
| Vinyl resin (VYCA-10 Union Carbide) a high molecular weight vinyl chloride-vinyl acetate copolymer containing 86% vinyl chloride | 50 |
| Asbestos (Johns Manville 7T 56) | 50 |
| Ground limestone (York) | 83 |
| Stabilizers from Argus: | |
| (1) Mark 140 | 2 |
| (2) Drapex 44 | 2 |
| Plasticizer-dioethyl phthalate (D.O.P. Flexol Union Carbide) | 9 |

The vinyl asbestos compound was banded on a Farrel 2 roll mill and the titanium dioxide added to the banded material while the rolls were turning.

Mill conditions:

Roll temperature:
Front: 305° F. (72 p.s.i.)
Back: Cool (water only) 2-4 p.s.i.
Nip setting:
5—band
15—flux (10 passes)
60—calender (2 passes)
Roll speed:
Front: 46 f.p.m.
Back: 32 f.p.m.
Molding: (Compression)—no shims
In juxtaposition
Preheat 2 minutes (Farrel 4½" diameter ram)
Increase pressure slowly to 11 tons (6 tons for individual tiles)
Cool 7 minutes

EXAMPLE 2

Pigment (2A)

To a hydro-classified slurry of rutile $TiO_2$ (700 parts) of about 20% solids, 0.1% $Al_2O_3$ was added as an aqueous aluminum sulfate solution. The slurry was heated to 70° C. and neutralized to pH 8.0 with "N" brand sodium silicate giving an $SiO_2$ content of 0.5%. After mixing 2 hours at 70° C., filtering and washing, the pigment was repulped at about 40% solids and treated with 0.1 part each of triethanolamine and ethyl hexoic acid. The slurry was mixed one hour at 50° C. and filtered. After drying, the pigment was twice passed through a 2" Reductionizer as in Example 1.

Pigment (2B)

Same as (2A) except for addition of 0.2% $Al_2O_3$ and 1.0% $SiO_2$.

Pigment (2C)

Same as (2A) except for addition of 0.3% $Al_2O_3$ and 1.5% $SiO_2$.

Pigment (2D)

Same as (2A) except for addition of 0.4% $Al_2O_3$ and 1.70% $SiO_2$.

TABLE II

| Pigment | Percent $SiO_2$ | Percent $Al_2O_3$ | Ratio $SiO_2/Al_2O_3$ | Percent green brightness | Yellow factor |
|---|---|---|---|---|---|
| (2A) | 0.5 | 0.1 | 5 | 44.3 | 5.65 |
| (2B) | 1.0 | 0.2 | 5 | 44.7 | 4.92 |
| (2C) | 1.5 | 0.3 | 5 | 44.8 | 4.47 |
| (2D) | 1.7 | 0.4 | 4.25 | 44.7 | 4.48 |

Vinyl asbestos tile made with $TiO_2$ containing $SiO_2$ and $Al_2O_3$ in listed amounts / Hunter reflectometer It can be seen from Table II that the effect of increasing hydrous oxide content of the $TiO_2$ while maintaining a $SiO_2/Al_2O_3$ ratio of 5 yielded vinyl asbestos tile of decreased yellow factor (i.e., increased blueness of color tone). (The trend was not continued for Pigment (2D), because the $SiO_2/Al_2O_3$ ratio of 5 in the $TiO_2$ was not maintained.)

EXAMPLE 3

Pigment (3A)

To a hydroclassified slurry of rutile $TiO_2$ (700 parts) of about 20% solids, 1.8% $Al_2O_3$ was added as an aqueous aluminum chloride solution. The slurry was heated to 70° C. and neutralized at pH 7.0 with sodium hydroxide. After mixing two hours at 70° C., and filtering and washing, the pigment was repulped at about 40% solids and treated with 0.1% each of triethanolamine and ethylhexoic acid. The slurry was mixed one hour at 50° C. and filtered. After drying, the pigment was twice passed through a 2″ Reductionizer.

Pigment (3B)

To a hydroclassified slurry of rutile $TiO_2$ (700 parts) of about 20% solids, 0.3% $Al_2O_3$ as an aqueous aluminum sulfate, was added. The slurry was heated to 70° C. and "N" brand sodium silicate was added in an amount equivalent to 0.6% $SiO_2$. The pH was then adjusted to 4.0 with NaOH. After mixing two hours at 70° C., and filtering and washing, the cake was repulped at about 40% solids, and treated with 0.1% each of triethanolamine and ethylhexoic acid. The slurry was mixed one hour at 50° C., and filtered. After drying, the pigment was twice passed through a 2″ Reductionizer.

Pigment (3C)

Same as (3B) but for addition of 0.9% $SiO_2$.

Pigment (3D)

Same as (3B) but for addition of 1.2% $SiO_2$ and of HCl to maintain a pH of 4.0.

Pigment (3E)

Same as (3B) but for addition of 1.5% $SiO_2$ and of HCl to maintain a pH of 4.0.

TABLE III

| Vinyl asbestos tiles made with $TiO_2$ containing $SiO_2$ and $Al_2O_3$ in the listed amounts | | | Hunter D-25 color diff. meter | |
| --- | --- | --- | --- | --- |
| Pigment | Percent $SiO_2$ | Percent $Al_2O_3$ | $SiO_2/Al_2O_3$ | $R_D$ | $B_L$ |
| (3A) | | 1.8 | | 42.0 | 4.3 |
| (3B) | 0.6 | 0.3 | 2 | 42.6 | 4.2 |
| (3C) | 0.9 | 0.3 | 3 | 42.5 | 4.2 |
| (3D) | 1.2 | 0.3 | 4 | 42.3 | 4.3 |
| (3E) | 1.5 | 0.3 | 5 | 43.0 | 4.1 |

Pigment (3E) of this invention has a level of tile brightness comparable to Pigment (3A) with about 7% more pigment. Thus Pigment (3E) of the invention is significantly more efficient and economical to produce.

EXAMPLE 4

Pigment (4A)

To a hydroclassified slurry of rutile $TiO_2$ (700 parts) of 20% solids, 0.3% $Al_2O_3$ as aluminum sulfate, was added. The slurry was heated to 70° C. and neutralized to pH 7.0 with sodium hydroxide. After mixing two hours at 70° C. and filtering and washing the cake was repulped at about 40% solids and treated with 0.1% each of triethanolamine and ethylhexoic acid. The slurry was mixed one hour at 50° C. and filtered. After drying, the pigment was twice passed through a two-inch Reductionizer as in Example 1, Pigment (1A).

Pigment (4B)

To a hydroclassified slurry of rutile $TiO_2$ (700 parts) of about 20% solids, 0.2% $Al_2O_3$ as aluminum sulfate and 0.25% of 10% HCl were added. The slurry was heated to 70° C., and "N" brand sodium silicate ($SiO_2/Na_2O$ ratio of 3.22 and 10% $SiO_2$) was added to pH 4.0, yielding a 1.2% $SiO_2$ concentration. After mixing two hours at 70° C. and filtering and washing, the cake was repulped at about 40% solids treated with 0.1% each of triethanolamine and ethylhexoic acid and completed as for Pigment (4A).

The pigments were incorporated with the vinyl asbestos composition, molded into tiles and analyzed for brightness and yellowness. The results are given in the following table.

TABLE IV

| Vinyl asbestos tiles made with $TiO_2$ containing $SiO_2$ and $Al_2O_3$ in the listed amounts | | | Hunter D-25 color diff. meter | |
| --- | --- | --- | --- | --- |
| Pigment | Percent $SiO_2$ | Percent $Al_2O_3$ | $SiO_2/Al_2O_3$ | $R_D$ | $B_L$ |
| (4A) | | 0.3 | | 44.6 | 3.5 |
| (4B) | 1.2 | 0.2 | 6 | 44.9 | 3.1 |

EXAMPLE 5

To a hydroclassified slurry of rutile $TiO_2$ (700 parts) of about 20% solids, 0.2% $Al_2O_3$ was added as an aqueous aluminum chloride solution and silicic acid sol was then added to a 1.2% $SiO_2$ level. The slurry was heated to 70° C. and neutralized to pH 7.0 with sodium hydroxide. After mixing two hours at 70° C., and filtering and washing, the cake was repulped at about 40% solids and treated with 0.1% each of triethanolamine and ethylhexoic acid. The slurry was mixed one hour at 50° C. and filtered. After drying, the pigment was twice passed through a 2″ Reductionizer. The silicic acid was prepared by passing "N" brand sodium silicate diluted to about 50 g./l. $SiO_2$ through a column of Dowex of 50 cation exchange resin in its hydrogen form.

The resulting $TiO_2$ was incorporated into vinyl asbestos tile by the above-defined procedure and, upon testing the tile was found to have a brightness ($R_D$) of 43.0 and a yellowness ($B_L$) of 3.7.

EXAMPLE 6

To a hydroclassified slurry of rutile $TiO_2$ (700 parts) of 20% solids, 0.3% $Al_2O_3$ as aluminum sulfate, was added. The slurry was heated to 70° C. and neutralized to pH 7.0 with sodium hydroxide. After mixing two hours at 70° C. and filtering and washing, the cake was repulped at about 40% solids. Then 1.5% $SiO_2$ as silicic acid sol was added along with 0.1% each of triethanolamine and ethylhexoic acid. The silicic acid was prepared by passing "N" brand sodium silicate, diluted to an $SiO_2$ content of about 50 g./l., through a column of Dowex 50 ion exchange resin. The slurry was mixed one hour at 50° C. and filtered. After drying, the pigment was twice passed through a two-inch Reductionizer as in Example I.

The pigment was incorporated into vinyl asbestos, molded into tiles and analyzed for brightness and yellowness. The tile had a brightness ($R_D$) of 45.3 and a yellowness ($B_L$) of 3.2.

EXAMPLE 7

Pigment A

To a hydroclassified slurry of rutile $TiO_2$ (700 g.) of about 20% solids, 0.3% $MgSO_4 \cdot 7H_2O$ and 0.2% $Al_2O_3$ as aluminum sulfate were added. Slurry was then heated to 70° C. and neutralized to 7.0 pH with sodium hydroxide. After mixing two hours at 70° C., filtering and washing, the cake was repulped at about 40% solids and treated with 0.1% each of triethanolamine and ethylhexoic acid. The slurry was mixed one hour at 50° C. and filtered. After drying, the pigment was given two passes through a two-inch Reductionizer with steam at 500° F. and 120 p.s.i.g.

Pigment B

Processed the same as (A) except 2.0% $SiO_2$ as ammomonium silicate was added to repulp along with the triethanolamine and ethylhexoic acid.

Pigment C

Processed the same as (A) except 2.0% $SiO_2$ as ammonium silicate was added to repulp along with triethanolamine and ethylhexoic acid. Results from preparations of vinyl absestos tile were as follows:

| Pigment | Percent $SiO_2$ | Percent $Al_2O_3$ | $SiO_2/Al_2O_3$ | $R_D$ | $B_L$ |
|---|---|---|---|---|---|
| A | | 0.2 | | 55.7 | 1.7 |
| B | 1.0 | 0.2 | 5 | 56.0 | 1.4 |
| C | 2.0 | 0.2 | 10 | 55.9 | 1.3 |

Vinyl asbestos tiles made with $TiO_2$ containing $SiO_2$ and $Al_2O_3$ in the listed amounts. Hunter D-25 color diff. meter The effect of the invention is to produce a tile of improved strength, brightness and blueness of tone.

The amount of pigment varies which is dispersed throughout the vinyl tile normally ranges from one to about eight percent by weight. The preferred concentration of the pigment is from two to about six percent by weight of the tile.

In the vinyl asbestos composition there is referenced the stabilizers. Such stabilizers are well known in vinyl abestos tile formulations and are generally of the class which are known as scavengers and/or heat stabilizers for polyvinyl chloride. Polyvinyl chloride scavengers include the organo phosphites and others which are set forth as useful for polyolefin applications as well as in polyvinyl chloride formulations in U.S. Pat. No. 2,985,617. Reference can also be made to that patent for useful concentrations levels.

The vinyl asbestos compositions feature the use of homopolymers and copolymers of vinyl chloride which may have a major proportion of vinyl chloride, for example, from about 75 to 100%; or may be copolymerized with up to about 25% of comonomers such as vinyl acetate or vinylidene chloride.

In further description of vinyl asbestos compositions and an improved method of their production, reference should be made to the copending U.S. patent application, Ser. No. 147,699 filed May 27, 1971. The amount of asbestos in the final composition is that which is normally employed to promote increased hardness in the final product without decreasing the strength thereof, and is employed in amounts of between about 15 to 30% of the final product.

We claim:

1. Vinyl asbestos tile of enhanced brightness and color tone, said vinyl consisting of a major proportion of polyvinyl chloride, said tile characterized by a dispersed pigment comprising finely divided $TiO_2$ coated with a mixture of hydrous oxides of silicon and aluminum in a proportion such that at least 5 weight parts of silica are used for each part of alumina and from 0.5 parts to 15 weight parts of combined hydrous oxides are used for each 100 weight parts of untreated $TiO_2$, said pigment being present in from one percent to about eight percent by weight of said tile.

2. The vinyl asbestos tile of claim 1 wherein said pigment ranges from about two percent to about six percent by weight of said tile.

3. The vinyl asbestos tile of claim 1 wherein said vinyl consists of the homopolymer and copolymer of vinyl chloride having at least 75 weight percent vinyl chloride and up to 25 weight percent of a comonomer such as vinyl acetate or vinylidene chloride and from about fifteen percent to thirty percent of asbestos based on the weight of said tile.

References Cited
UNITED STATES PATENTS

| | | | |
|---|---|---|---|
| 3,307,969 | 3/1967 | Quinn | 260—41.5 R |
| 3,563,939 | 2/1971 | Stevens | 260—41 B |
| 2,899,398 | 8/1959 | Pflaumer | 260—41 A |
| 3,184,428 | 5/1965 | Hecker | 260—41 A |
| 3,180,848 | 4/1965 | Thompson | 260—41 A |

OTHER REFERENCES

Materials and Compounding Ingredients for Rubber & Plastics, 1965, pp. 425, 446, 460 and 466.

Hackh's Chemical Dictionary, 3rd ed., 1944, p. 39.

MORRIS LIEBMAN, Primary Examiner

P. R. MICHL, Assistant Examiner

U.S. Cl. X.R.

260—41 B